(12) United States Patent
Qiao et al.

(10) Patent No.: US 11,396,983 B2
(45) Date of Patent: Jul. 26, 2022

(54) LIGHT DISTRIBUTION ELEMENT, LIGHT SOURCE ASSEMBLY AND LIGHTING

(71) Applicant: OPPLE LIGHTING CO., LTD., Shanghai (CN)

(72) Inventors: Shengjie Qiao, Shanghai (CN); Guolong Ni, Shanghai (CN)

(73) Assignee: Opple Lighting Co., Ltd., Shanghai (CN)

(*) Notice: Subject to any disclaimer, the term of this patent is extended or adjusted under 35 U.S.C. 154(b) by 0 days.

(21) Appl. No.: 17/139,217

(22) Filed: Dec. 31, 2020

(65) Prior Publication Data

US 2021/0123574 A1   Apr. 29, 2021

Related U.S. Application Data

(63) Continuation of application No. PCT/CN2019/112365, filed on Oct. 21, 2019.

(30) Foreign Application Priority Data

Oct. 31, 2018  (CN) .......................... 201811287965.8
Oct. 31, 2018  (CN) .......................... 201821787842.6

(51) Int. Cl.
*F21K 9/68* (2016.01)
*F21K 9/20* (2016.01)
(Continued)

(52) U.S. Cl.
CPC .................. *F21K 9/68* (2016.08); *F21K 9/20* (2016.08); *F21K 9/69* (2016.08); *G02B 3/08* (2013.01); *H05B 45/30* (2020.01)

(58) Field of Classification Search
None
See application file for complete search history.

(56) References Cited

U.S. PATENT DOCUMENTS 7,762,705 B2   7/2010  Sakai et al.
8,292,466 B2  10/2012  Huang
(Continued)

FOREIGN PATENT DOCUMENTS

CN   101013227 A   8/2007
CN   102003676 A   4/2011
(Continued)

OTHER PUBLICATIONS

International Search Report of PCT Application No. PCT/CN2019/112365 dated Dec. 27, 2019 with English translation, (6p).

*Primary Examiner* — Elmito Breval
(74) *Attorney, Agent, or Firm* — Arch & Lake LLP (57) ABSTRACT

The present disclosure discloses a light distribution element, a light source assembly and a lighting lamp. The light distribution element comprises a light source cavity, a first face, an incident face and an emitting face. The first face and the emitting face are arranged opposite to each other. The light source cavity is formed in a manner that the first face is concaved towards a side where the emitting face is located, the incident face is an inner surface of the light source cavity, and the incident face includes a Fresnel surface. The emitting face includes a concave reflecting face, and the concave reflecting face is concaved towards a side where the incident face is located.

17 Claims, 7 Drawing Sheets

(51) Int. Cl.
*F21K 9/69* (2016.01)
*H05B 45/30* (2020.01)
*G02B 3/08* (2006.01)

(56) References Cited

U.S. PATENT DOCUMENTS

| | | | |
|---|---|---|---|
| 2007/0121340 | A1 | 5/2007 | Hoshi |
| 2013/0194795 | A1* | 8/2013 | Onaka ................ G02B 19/0066 |
| | | | 362/231 |
| 2014/0133180 | A1 | 5/2014 | Sakai |
| 2017/0030551 | A1* | 2/2017 | Chiu ......................... F21V 5/04 |
| 2017/0059122 | A1* | 3/2017 | Chiu ..................... F21V 7/0091 |

FOREIGN PATENT DOCUMENTS

| | | |
|---|---|---|
| CN | 202720391 U | 2/2013 |
| CN | 106439729 A | 2/2017 |
| CN | 109268707 A | 1/2019 |
| KR | 20130000903 | 1/2013 |

* cited by examiner

LIGHT DISTRIBUTION ELEMENT, LIGHT SOURCE ASSEMBLY AND LIGHTING

CROSS-REFERENCE TO RELATED APPLICATIONS

This application is based upon and claims the priority of PCT patent application No. PCT/CN2019/112365 filed on Oct. 21, 2019 which claims priority to the Chinese patent application No. 201811287965.8 filed on Oct. 31, 2018 and the Chinese patent application No. 201821787842.6 filed on Oct. 31, 2018, the entire content of all of which is hereby incorporated by reference herein for all purposes.

TECHNICAL FIELD

The present disclosure relates to a technical field of lighting devices, in particular to a light distribution element, a light source assembly and a lighting lamp.

BACKGROUND

As the requirements of people for ambient illumination become higher and higher, the performance of lighting lamps is greatly improved as well. At present, there are many kinds of lighting lamps, light emitting units (such as light-emitting diode (LED) light emitting units) are arranged in the lighting lamps, and light rays emitted by the light emitting units are scattered and emitted after passing through light distribution elements.

SUMMARY

The present disclosure provides a light distribution element, a light source assembly, and a lighting lamp.

According to a first aspect, the present disclosure provides a light distribution element including a light source cavity, a first face, an incident face and an emitting face. The first face and the emitting face are arranged opposite to each other. The light source cavity is formed in a manner that the first face is concaved towards a side where the emitting face is located. The incident face is an inner surface of the light source cavity, and the incident face includes a Fresnel surface. The emitting face includes a concave reflecting face, and the concave reflecting face is concaved towards a side where the incident face is located.

According to a second aspect, the present disclosure provides a light source assembly including a light source plate, a light emitting unit arranged on the light source plate and a light distribution element arranged on the light source plate.

The light distribution element includes: a light source cavity, a first face, an incident face and an emitting face. The first face and the emitting face are arranged opposite to each other. The light source cavity is formed in a manner that the first face is concaved towards a side where the emitting face is located. The incident face is an inner surface of the light source cavity, and the incident face includes a Fresnel surface. The emitting face includes a concave reflecting face, and the concave reflecting face is concaved towards a side where the incident face is located. The light distribution element covers the light emitting unit, and the first face is attached to the light source plate.

According to a third aspect, the present disclosure provides a lighting lamp including a driver and a light source assembly, and the driver is electrically connected to the light source assembly.

The light source assembly includes a light source plate, a light emitting unit arranged on the light source plate, and a light distribution element arranged on the light source plate. The light distribution element includes a light source cavity, a first face, an incident face and an emitting face. The first face and the emitting face are arranged opposite to each other and the light source cavity is formed in a manner that the first face is concaved towards a side where the emitting face is located. The incident face is an inner surface of the light source cavity, and the incident face includes a Fresnel surface. The emitting face includes a concave reflecting face, and the concave reflecting face is concaved towards a side where the incident face is located. The light distribution element covers the light emitting unit, and the first face is attached to the light source plate.

It is to be understood that both the foregoing general description and the following detailed description are exemplary and explanatory only and are not restrictive of the present disclosure.

BRIEF DESCRIPTION OF THE DRAWINGS

Drawings explained here are used for providing further comprehension for the present disclosure and constitute a part of the present disclosure, and the schematic examples and explanations of the present disclosure are used for explaining the present disclosure but not constitute the improper limitation for the present disclosure. In the drawings.

DETAILED DESCRIPTION

In order to make objects, technical details and advantages of the present disclosure apparent, the technical solutions of the present disclosure will be described in a clearly and fully understandable way in connection with the examples and the corresponding drawings. It is obvious that the described examples are just a part but not all of the examples of the present disclosure. Based on the described examples herein, those skilled in the art may obtain other example(s), without any inventive work, which should be within the scope of the present disclosure.

It shall be understood that, although the terms "first," "second," "third," and the like may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

Description of reference numerals used in this disclosure may include:

100—light source plate, 200—light distribution element, 210—light source cavity, 220—first face, 230—incident face, 231—Fresnel surface, 232—columnar face, 240—emitting face, 241—concave reflecting face, 242—second face, 300—light emitting unit, and 400—reflecting piece.

A light guide plate is one structure form of a light distribution element, and a lateral entry type light guide plate and a direct type light guide plate are commonly used at present. When the lateral entry type light guide plate is adopted, light emitting units are located on the lateral side of the light distribution element, the requirement for light emitting uniformity may be met by arranging more light emitting units, and consequently the cost of a lighting lamp is high; and when the direct type light guide plate is adopted, the light emitting units are arranged below the light distribution element, thus, the requirement for light emitting uniformity may be met by arranging few light emitting units, but because the light emitting units are arranged below the light guide plate, the space occupied by the light emitting units and the light guide plate is large, and consequently the space utilization rate of the lighting lamp is low.

The examples of the present disclosure discloses a lighting lamp, and the lighting lamp includes a driver and a light source assembly. The driver is electrically connected to the light source assembly so that energy may be provided for the light source assembly, and the light source assembly may emit light rays. The lighting lamp disclosed in the examples of the present disclosure may be a ceiling lamp, a pendant lamp, and the like.

As illustrated in FIG. 1-FIG. 4, the light source assembly may include a light source plate 100, a light distribution element 200 and a light emitting unit 300. The light source plate 100 is electrically connected to the above-mentioned driver so that the driver may provide the light source plate 100 with electric energy required for emitting light. The light emitting unit 300 is arranged on the light source plate 100, thus, the light source plate 100 may supply power to the light emitting unit 300 to make the light emitting unit 300 emit light, an LED (light emitting diode) unit and other structure forms may be adopted in the light emitting unit 300. The light distribution element 200 is also arranged on the light source plate 100, the light distribution element 200 covers the light emitting unit 300 and the light source plate 100, accordingly, through reflection, refraction and other forms, the direction and other parameters of light rays emitted by the light emitting unit 300 may be adjusted, and the light emitting effect of the whole lighting lamp meets the requirements. The light emitting units 300 may be arranged in plural, and the plurality of light emitting units 300 may all be fixed on the light source plate 100. Each light source cavity 210 may accommodate only one light emitting unit 300 and may also accommodate two or even more light emitting units 300.

In an example, the light distribution element 200 may be a lens, the injection molding material of the lens may be PC (polycarbonate) or PMMA (polymethyl methacrylate) transparent particles. Certainly, the light distribution element 200 may also be a light guiding cover, the light guiding cover may serve as an appearance piece, and for example, the light distribution element 200 may be directly set as an optical mask of the lighting lamp.

As illustrated in FIG. 1-FIG. 6, the light distribution element 200 is provided with a light source cavity 210, a first face 220, an incident face 230 and an emitting face 240, wherein the incident face 230 and the emitting face 240 are located on the two sides of the light distribution element 200 correspondingly. The first face 220 and the emitting face 240 are arranged opposite to each other, and the first face 220 is attached to the light source plate 100 and is directly or indirectly connected to the incident face 230 and the emitting face 240. The light source cavity 210 is used for accommodating the light emitting unit 300 and is formed in the manner that the first face 220 is concaved towards the side where the emitting face 240 is located. The incident face 230 is the inner surface of the light source cavity 210 and includes a Fresnel surface 231, and in the direction (that is, the X direction in FIG. 4) of the optical axis of the light emitting unit 300, the section of the Fresnel surface 231 is of a sawtooth-shaped structure. The emitting face 240 includes a concave reflecting face 241 concaved towards the side where the incident face 230 is located. Light rays emitted by the light emitting unit 300 firstly arrive at the incident face 230 and then are emitted by the emitting face 240 after being reflected or refracted in the light distribution element 200. The concave reflecting face 241 has the capability of light ray reflecting, and therefore the concave reflecting face 241 may change the light emitting direction and the light emitting position of at least a part of light rays, and accordingly change the distribution situation of the light rays on the emitting face 240.

The light distribution element 200 disclosed in the example of the present disclosure is provided with the light source cavity 210, the light source cavity 210 is opposite to the emitting face 240, and therefore the light emitting unit 300 may be located below the light distribution element 200, the requirement for light emitting uniformity may be met by matching few light emitting units 300 on the light distribution element 200, and therefore the lighting lamp adopting the light distribution element 200 is lower in cost. Meanwhile, the light source cavity 210 may accommodate the light emitting unit 300, the space integrally occupied by the entirety of the light distribution element 200 and the light emitting unit 300 is reduced, and accordingly the space utilization rate of the lighting lamp is increased.

The structure of the concave reflecting face 241 above-mentioned may be flexibly selected, and for example, the structure may be a step face. But, in order to improve light emitting uniformity, further improvement is conducted on the structure of the concave reflecting face 241 in the example of the present disclosure. In the direction parallel to the optical axis of the light emitting unit 300, the section of the concave reflecting face 241 is in a V shape. In other words, in the direction gradually close to the incident face 230, the concave reflecting face 241 is of a gradual shrinkage structure, the size change of the concave reflecting face 241 is relatively stable, and the situation of sudden changes of the size basically may not happen. In this way, after being reflected by the concave reflecting face 241, the light rays may be more evenly emitted.

Furthermore, the concave reflecting face 241 may be set as a revolution surface, and a revolution axis of the concave reflecting face 241 may be parallel to the optical axis of the light emitting unit 300. Through the arrangement, after being reflected by the concave reflecting face 241, the light rays may be more evenly diffused with its own revolution axis as the center, and the purpose of improving the light emitting effect is achieved.

In one alternative example, the Fresnel surface 231 may be a revolution surface, a revolution axis of the Fresnel surface 231 is parallel to the optical axis of the light emitting unit 300, and the Fresnel surface 231 is formed by a plurality of big-to-small concentric circle structures at the time. To optimize the light emitting effect, the circle center of the Fresnel surface 231 may be located on the optical axis of the light emitting unit 300, and the light rays are evenly diffused with the optical axis of the light emitting unit 300 as the center.

Because the concave reflecting face 241 is of a concave structure, the concave reflecting face 241 has a lowest point. When the Fresnel surface 231 is a revolution surface, the point on the concave reflecting face 241 which is closest to the circle center of the Fresnel surface 231 is the lowest point of the concave reflecting face 241, and the lowest point is located on the revolution axis of the concave reflecting face 241. To optimize the light emitting uniformity of the lighting lamp, the lowest point of the concave reflecting face 241 may be located on the optical axis of the light emitting unit 300 and the revolution axis of the Fresnel surface 231 at the same time. In other words, the revolution axis of the concave reflecting face 241, the revolution axis of the Fresnel surface 231 and the optical axis of the light emitting unit 300 are collinear. Through the arrangement, light rays emitted by the light emitting unit 300 may be more evenly distributed.

When the concave reflecting face 241 is a revolution surface, the concave reflecting face 241 has a revolution generatrix besides the revolution axis, and the concave reflecting face 241 is formed when the revolution generatrix rotates around the revolution axis by one circle. The revolution generatrix may be a straight line and may also be a curve. To further improve the light emitting effect, the revolution generatrix is set as an arc curve in the example of the present disclosure, and in the direction close to the incident face 230, the curvature of at least one part of the arc curve is gradually increased firstly and then gradually reduced. In other words, the revolution generatrix has a part with small curvature changes and a part with large curvature changes at the same time, and the part with small curvature changes is farer away from the incident face 230 compared with the part with large curvature changes.

As mentioned above, the concave reflecting face 241 may reflect light rays penetrating through the incident face 230, and therefore the size of the concave reflecting face 241 will directly affect the amount of the light rays reflected by the concave reflecting face 241. To ensure that most of light rays penetrating through the incident face 230 may be reflected by the concave reflecting face 241, in the direction parallel to the optical axis of the light emitting unit 300, the projection face of the concave reflecting face 241 covers the projection face of the incident face 230. In other words, when the light distribution element 200 is viewed from the upper position of the concave reflecting face 241, the concave reflecting face 241 may block the incident face 230, and therefore the area of the concave reflecting face 241 is larger than that of the incident face 230.

The emitting face 240 of the light distribution element 200 may only include the concave reflecting face 241 mentioned above and may further include a second face 242 connected to the concave reflecting face 241, and the first face 220 and the second face 242 both are planes and are parallel to each other. The adjusting function of the second face 242 on the light path direction here is different from the adjusting function of the concave reflecting face 241 on the light path direction, and therefore the second face 242 may work together with the concave reflecting surface 241 to make the light rays emitted from the whole emitting surface 240 more evenly.

The edge of one end of the concave reflecting face 241 away from the incident face 230 is the top edge of the concave reflecting face 241, and the shape of the top edge may be round, oval, triangular, rectangular, pentagonal, hexagonal or octagonal and other shapes. The light emitting effect of the light distribution element 200 may be different by selecting different shapes. In addition, the shape of the intersecting line of the incident face 230 and the first face 220 may be round, oval, triangular, rectangular, pentagonal, hexagonal or octagonal and other shapes. Similarly, the light emitting effect of the light distribution element 200 may be different by selecting different shapes for the intersecting line.

In the example of the present disclosure, only one light source cavity 210 and one concave reflecting face 241 may be arranged, but to meet a wide range of lighting requirement, the light source cavities 210 and the concave reflecting faces 241 may also be arranged in plural, and the light source cavities 210 are opposite to the concave reflecting faces 241 one by one. With this arrangement, light rays emitted by the corresponding light emitting unit 300 arranged in each light source cavity 210 are mainly reflected by the concave reflecting face 241 corresponding to the light source cavity 210, the reflecting effect is better, and the light emitting effect of the lighting lamp is better optimized. At this time, the shape of the plurality of concave reflecting faces 241 and the shape of the plurality of light source cavities 210 may be the same and may also be different.

When the light source cavities 210 are arranged in plural, the light source cavities 210 may be arranged at intervals, through this arrangement, the arrangement of a plurality of light emitting units 300 may be satisfied, so that the irradiation area is increased, and the problem of cost consumption caused by excessive concentrated arrangement of the light source cavities 210 may be avoided. When the concave reflecting faces 241 are arranged in plural, adjacent ones of the concave reflecting faces 241 may be connected to each other, so that the area of the reflecting face formed by the concave reflecting faces 241 may be increased, the light ray reflecting effect is improved, and the light rays are further promoted to be evenly emitted.

To further improve the light emitting effect, the light source cavities 210 may be arranged in a line and row manner. At the time, the light source cavities 210 in different lines may be arranged in an aligned manner and may also be arranged in a staggered manner in the row direction, and accordingly different light emitting effects may be achieved. In a similar way, the concave reflecting faces 241 may be arranged in a line and row manner as well, and the concave reflecting faces 24 in different lines may be arranged in an aligned manner and may also be arranged in a staggered manner in the row direction.

In an example, as illustrated in FIG. 1-FIG. 6, in the light distribution element 200, the top edge of the concave reflecting face 241 may be a round edge, the plurality of concave reflecting faces 241 are arranged in a line and row manner, the concave reflecting faces 241 in different lines are arranged in a staggered manner in the row direction, the intersecting line of the incident face 230 and the first face 220 is in a round shape, the plurality of light source cavities 210 are arranged in a line and row manner, and the light source cavities 210 in different lines are arranged in a staggered manner in the row direction.

As illustrated in FIG. 7-FIG. 10, in the light distribution element 200, the top edge of the concave reflecting face 241 is a hexagonal edge (the top edges of a part of the concave reflecting faces 241 are hexagonal edges, and the top edges of another part of the concave reflecting faces 241 are formed through combination of straight lines and arc lines), the plurality of concave reflecting faces 241 are arranged in a line and row manner and adjacent ones of the plurality of concave reflecting faces 241 are connected to each other, the concave reflecting faces 241 in different lines are arranged in a staggered manner in the row direction, the intersecting line of the incident face 230 and the first face 220 is in a round shape, the plurality of light source cavities 210 are arranged in a line and row manner, and the light source cavities 210 in different lines are arranged in a staggered manner in the row direction.

As illustrated in FIG. 11-FIG. 14, in the light distribution element 200, the top edge of the concave reflecting face 241 may be a rectangular edge (the top edges of a part of the concave reflecting faces 241 are rectangular edges, and the top edges of a part of the concave reflecting faces 241 are formed through combination of straight lines and arc lines), the plurality of concave reflecting faces 241 are arranged in a line and row manner and adjacent ones of the plurality of concave reflecting faces 241 are connected to each other, the concave reflecting faces 241 in different lines are arranged in an aligned manner in the row direction, the intersecting line of the incident face 230 and the first face 220 is in a round shape, the plurality of light source cavities 210 are arranged in a line and row manner, and the light source cavities 210 in different lines are arranged in an aligned manner in the row direction.

Figure 1:
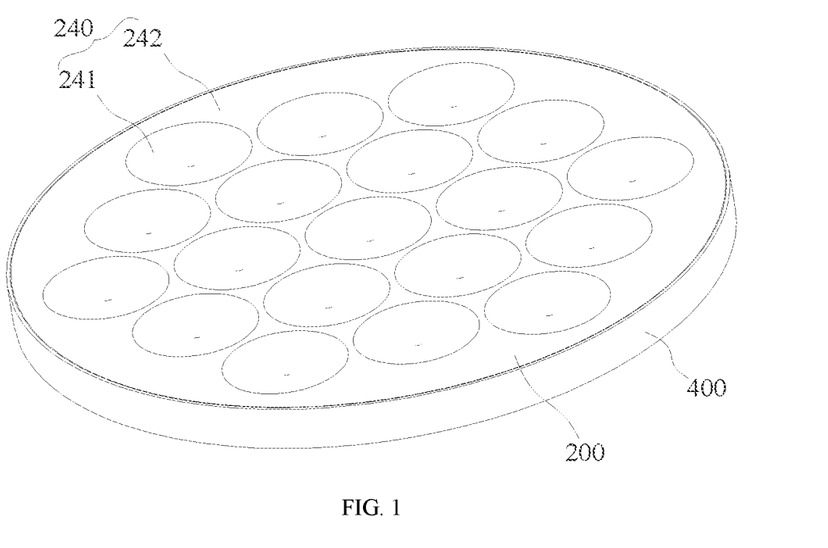
FIG. 1 is a schematic structural diagram of a light source assembly disclosed in an example of the present disclosure.
Figure 2:
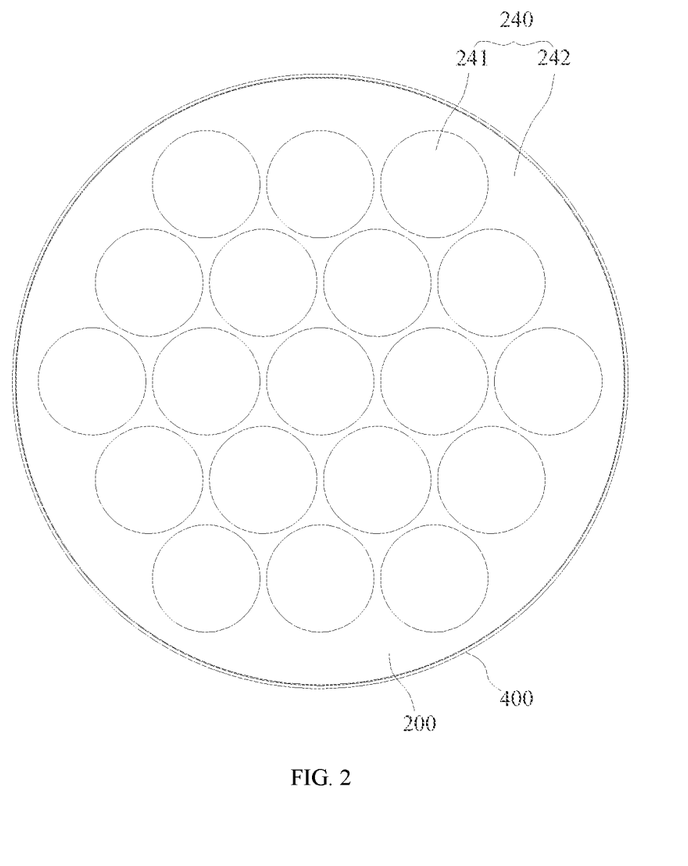
FIG. 2 is a top view of a light source assembly disclosed in an example of the present disclosure.
Figure 3:
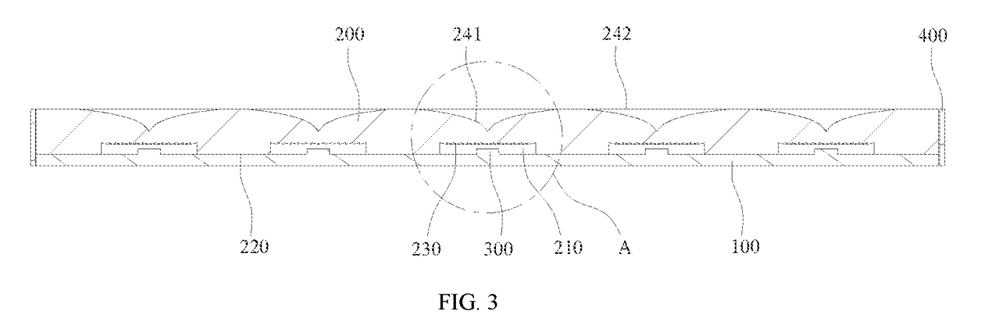
FIG. 3 is a section view of a light source assembly disclosed in an example of the present disclosure.
Figure 4:
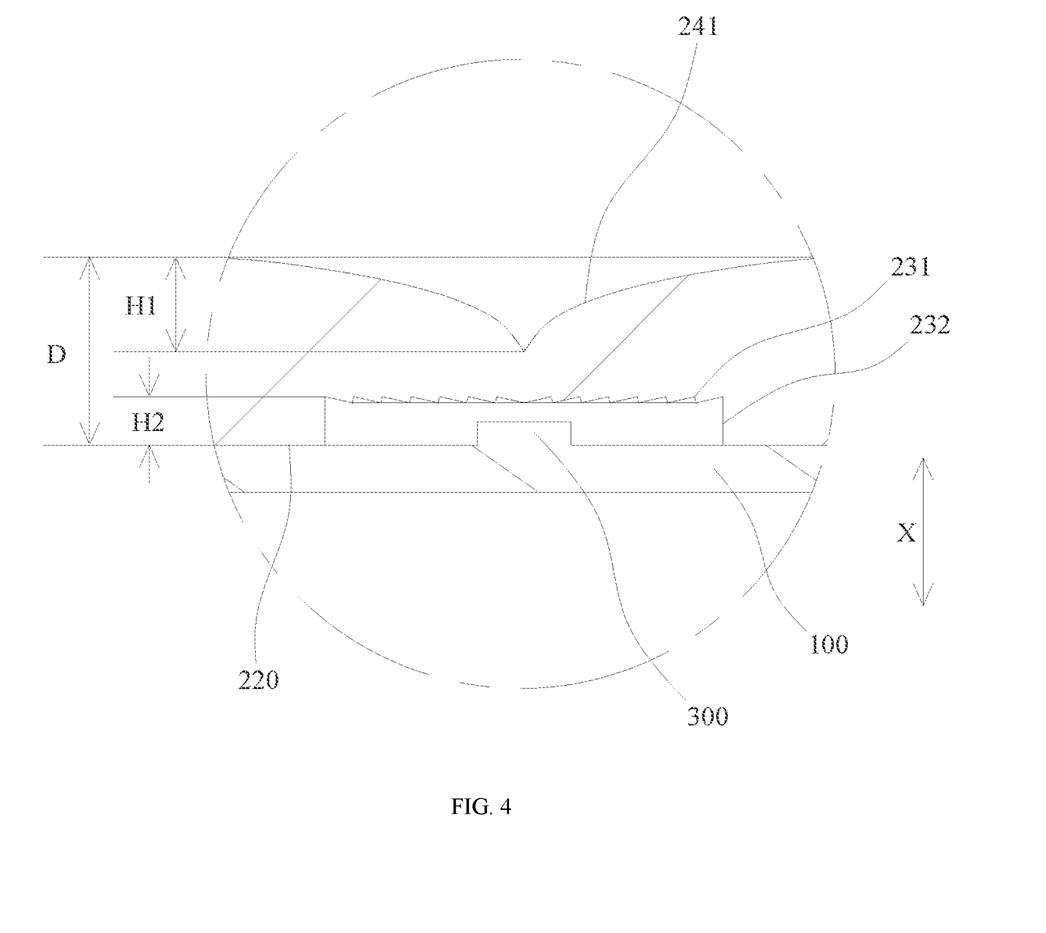
FIG. 4 is a partial enlarged view of part A in FIG. 3.
Figure 5:
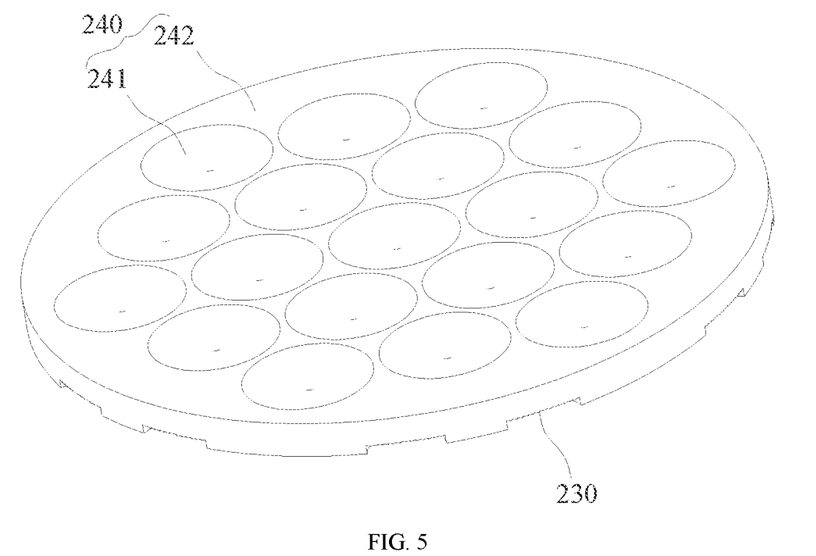
FIG. 5 is a schematic structural diagram of a light distribution element disclosed in an example of the present disclosure.
Figure 6:
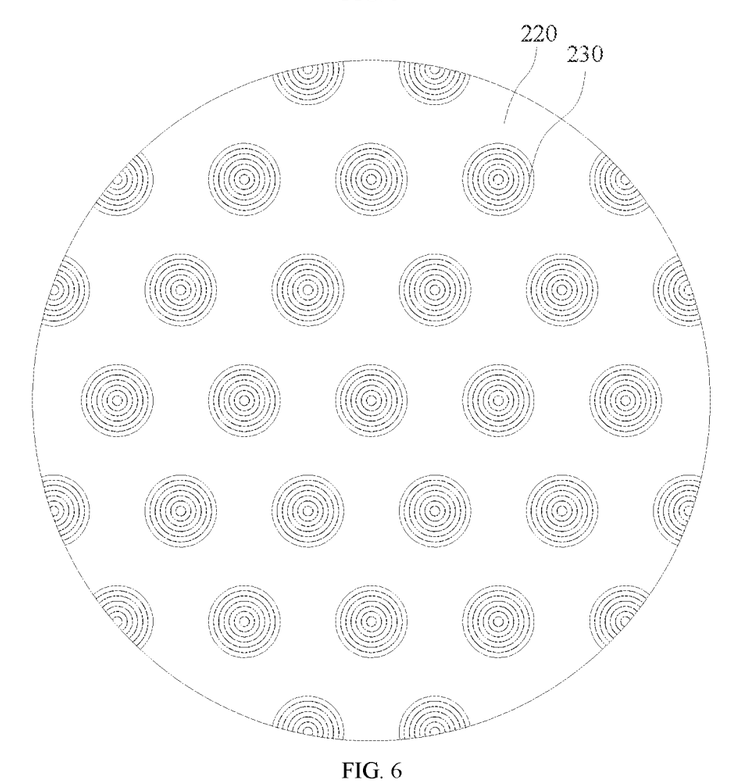
FIG. 6 is a bottom view of the light distribution element illustrated in FIG. 5.
Figure 7:
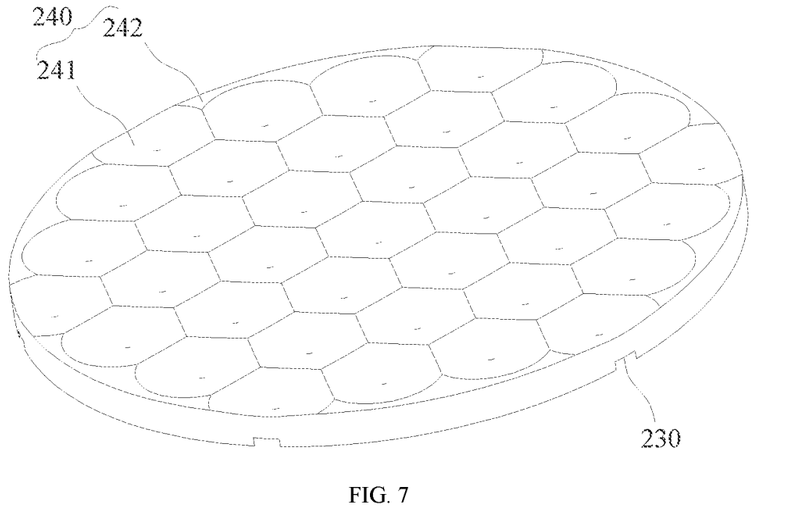
FIG. 7 is a schematic structural diagram of a light distribution element disclosed in another example of the present disclosure.
Figure 8:
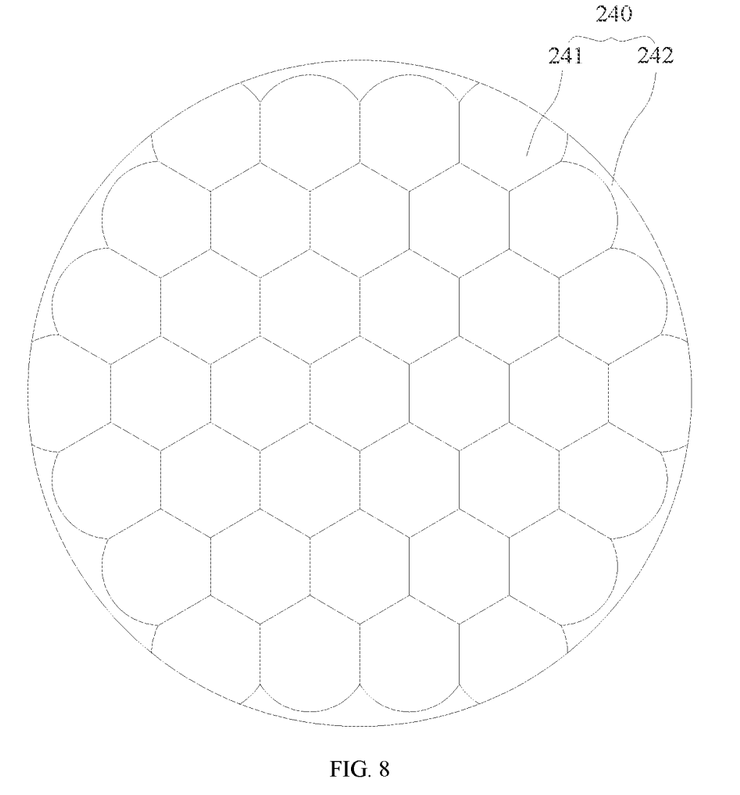
FIG. 8 is a top view of the light distribution element illustrated in FIG. 7.
Figure 9:
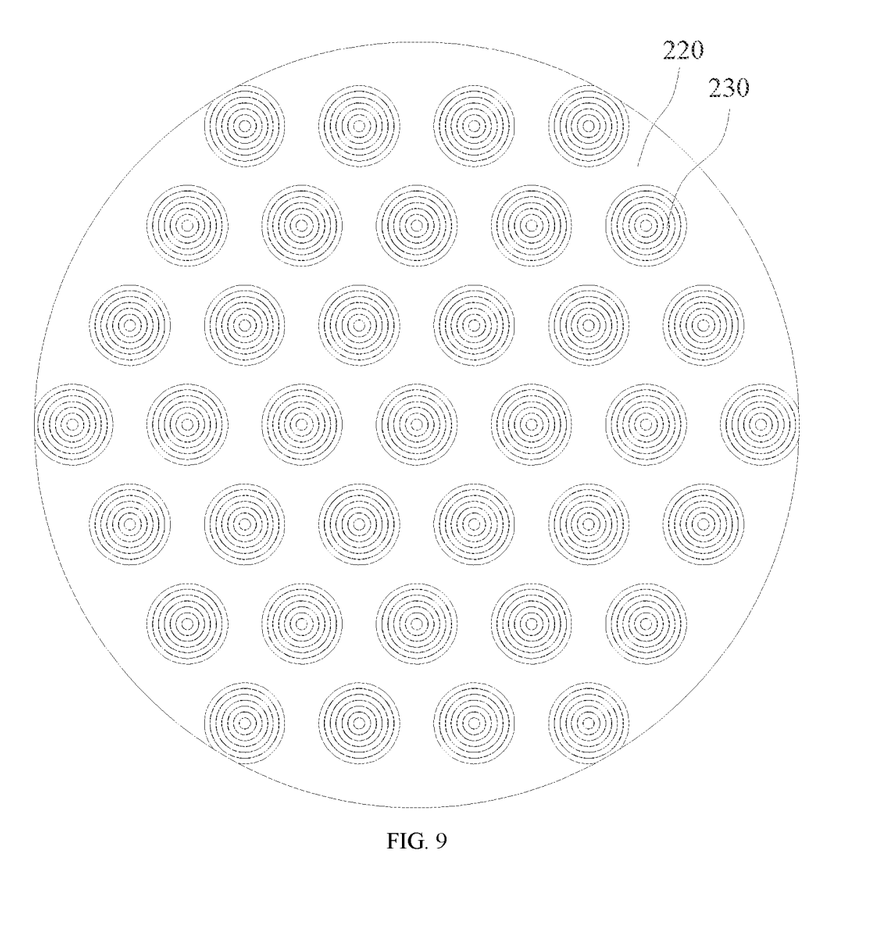
FIG. 9 is a bottom view of the light distribution element illustrated in FIG. 7.
Figure 10:
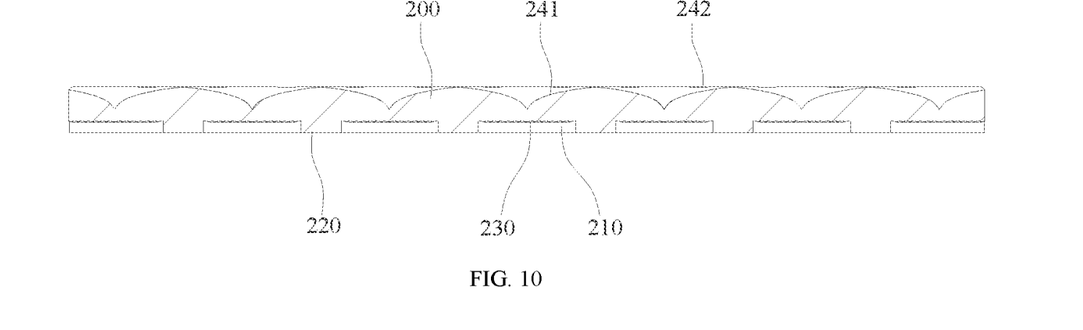
FIG. 10 is a section view of the light distribution element illustrated in FIG. 7.
Figure 11:
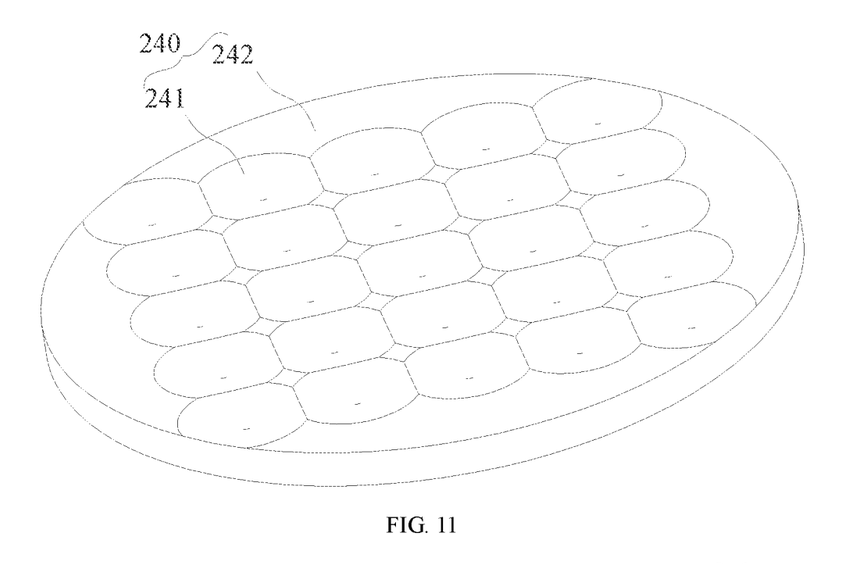
FIG. 11 is a schematic structural diagram of a light distribution element disclosed in another example of the present disclosure.
Figure 12:
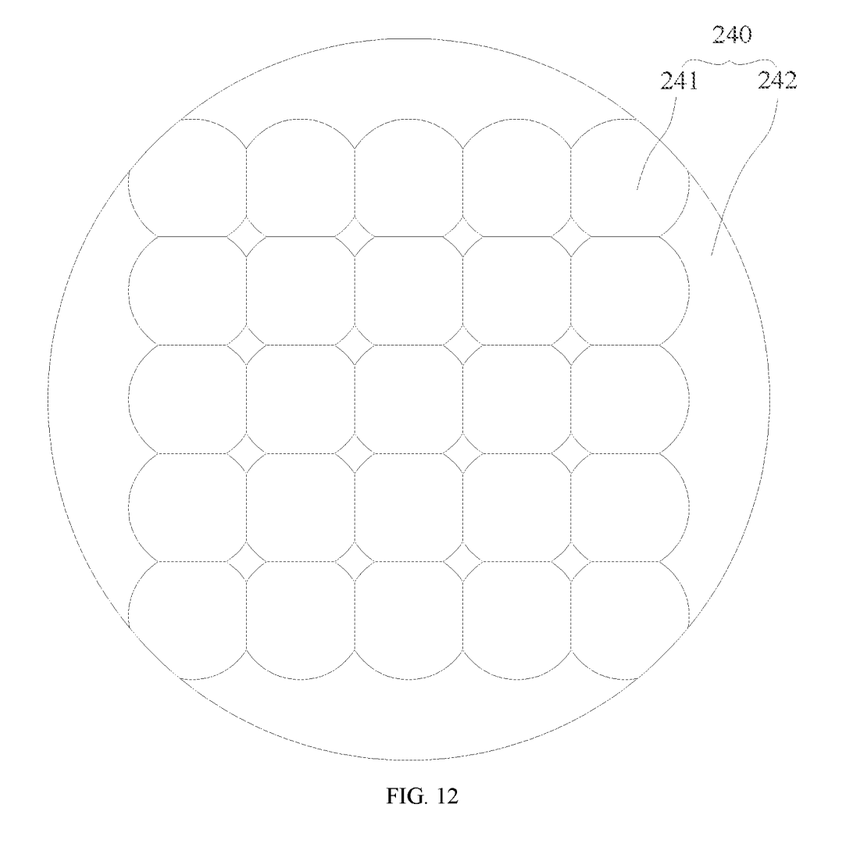
FIG. 12 is a top view of the light distribution element illustrated in FIG. 11.
Figure 13:
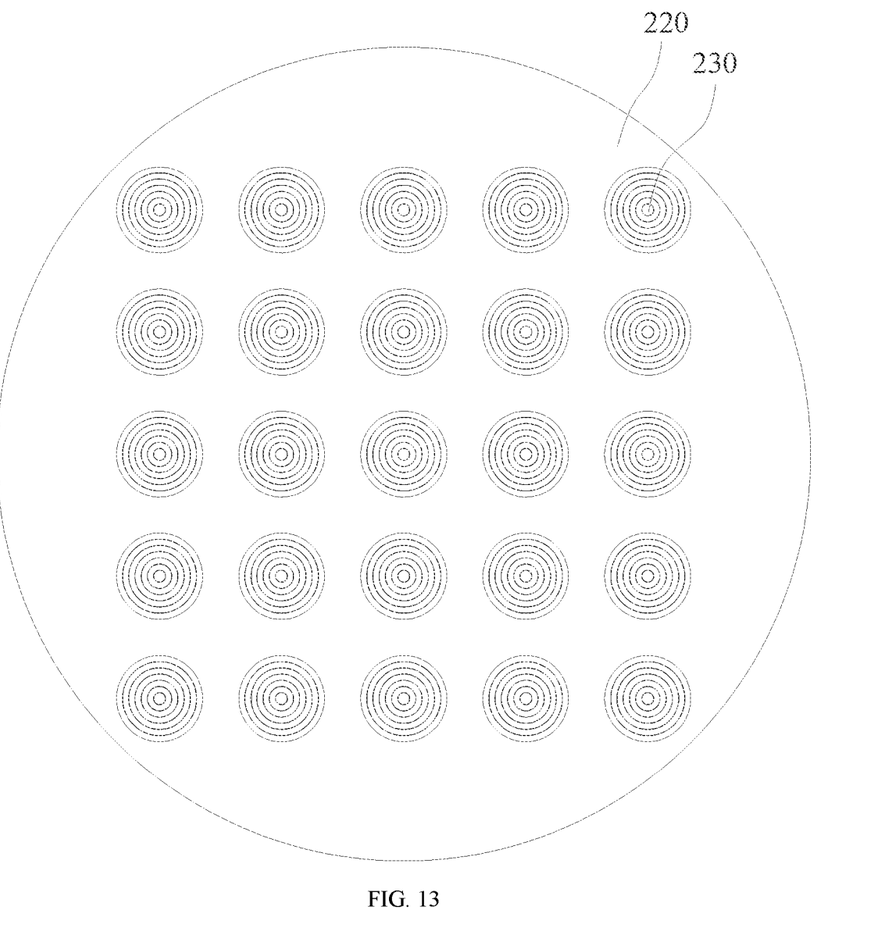
FIG. 13 is a bottom view of the light distribution element illustrated in FIG. 11.
Figure 14:
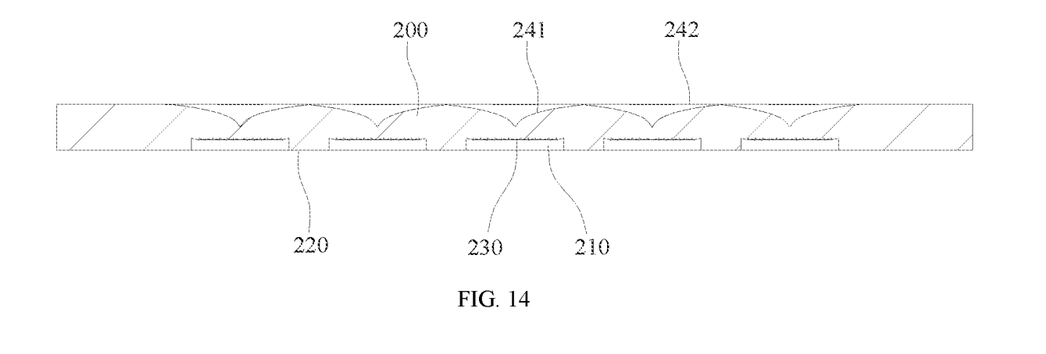
FIG. 14 is a section view of the light distribution element illustrated in FIG. 11.

As illustrated in FIG. 4, in one alternative example, the incident face 230 further includes a columnar face 232, the Fresnel surface 231 is connected to the first face 220 through the columnar face 232, and the extension direction of the columnar face 232 is parallel to the optical axis of the light emitting unit 300. A part of the light rays emitted by the light emitting unit 300 are incident from the Fresnel surface 231, the other part of the light rays emitted by the light emitting unit 300 are incident from the columnar face 232, and therefore the columnar face 232 may adjust the spreading direction of the light rays emitted by the light emitting unit 300, and the irradiation range and uniformity of the light rays emitted by the light emitting unit 300 are more ideal.

In the example of the present disclosure, the concave reflecting face 241 and the incident face 230 are both of a concave structure, and therefore the concave degree of the concave reflecting face 241 and the incident face 230 may influence the light emitting effect and the structure strength of the light distribution element 200. Referring to FIG. 4, alternatively, a distance between the lowest point of the concave reflecting face 241 and the top edge of the concave reflecting face 241 in the direction of the optical axis of the light emitting unit 300 is a first depth H1, and the lowest point is the point on the concave reflecting face 241 which is closest to the first face 220. The first depth H1 represents the concave degree of the concave reflecting face 241, and in order to improve the light emitting effect and ensure the structure strength of the light distribution element 200, the ratio of the first depth H1 and the thickness D of the light distribution element 200 is in a range of $1/3$-$2/3$. It needs to be explained that the direction of the thickness D is parallel to the optical axis of the light emitting unit 300.

Similarly, a distance between the highest point of the incident face 230 and the bottom edge of the incident face 230 in the direction of the light emitting unit 300 is a second depth H2, the highest point is the point on the incident face 230 which is closest to the first face 220, and the ratio of the second depth H2 and the thickness D of the light distribution element 200 is in a range of $1/5$-$1/2$.

Furthermore, the light distribution element 200 is further provided with a concave light homogenizing face, and the concave light homogenizing face is formed in the manner that the first face 220 is concaved towards the side where the concave reflecting face 241 is located. In other words, the concave light homogenizing face and the incident face 230 are the same in concave direction. The concave light homogenizing faces may be arranged in plural and are arranged in a line and row manner or a circular radiation manner, and so that the light homogenizing effect is achieved in a larger area.

If the size of the above-mentioned concave light homogenizing face is too large, it will not only occupy the area of the light distribution element 200 on the side where the incident surface 230 is arranged, and then affect the size and arrangement of the incident surface 230, but also cause the reflection effect of light rays to become poor, so the size of the concave homogenizing surface may be set smaller. Certainly, to facilitate machining of the concave light homogenizing face, the size of the concave light homogenizing face may not be too small. Based on this, the intersecting line of the concave light homogenizing face and the first face 220 may be set as a circular line in the example of the present disclosure, the diameter of the circular line is in a range of 0.8-1 mm to control the size of the concave light homogenizing face. The concave light homogenizing face may be a spherical surface structure.

To increase the light ray utilization rate, a reflecting piece 400 may be arranged in the circumferential direction of the light distribution element 200, the reflecting piece 400 may reflect light rays, and the reflecting piece 400 may be a reflecting film made of PET (polyethylene terephthalate) material.

The present disclosure provides a light distribution element, a light source assembly, and a lighting lamp.

At a first aspect, an example of the present disclosure provides a light distribution element including a light source cavity, a first face, an incident face and an emitting face. The first face and the emitting face are arranged opposite to each other. The light source cavity is formed in a manner that the first face is concaved towards a side where the emitting face is located. The incident face is an inner surface of the light source cavity, and the incident face includes a Fresnel surface. The emitting face includes a concave reflecting face, and the concave reflecting face is concaved towards a side where the incident face is located.

In one example mode, in a direction parallel to an optical axis of a light emitting unit, a section of the concave reflecting face is in a V shape.

In one example mode, the concave reflecting face is a revolution surface, and a revolution axis of the concave reflecting face is parallel to the optical axis; and the Fresnel surface is a revolution surface, a revolution axis of the Fresnel surface is parallel to the optical axis, and a circle center of the Fresnel surface is on the optical axis.

In one example mode, a point on the concave reflecting face which is closest to the circle center is a lowest point of the concave reflecting face, and the lowest point is on the optical axis and the revolution axis of the Fresnel surface at the same time.

In one example mode, a revolution generatrix of the concave reflecting face is an arc curve, and in a direction close to the incident face, a curvature of at least a part of the arc curve is gradually increased firstly and then gradually reduced.

In one example mode, in a direction parallel to an optical axis of a light emitting unit, a projection face of the concave reflecting face covers a projection face of the incident face.

In one example mode, the emitting face further includes a second face connected to the concave reflecting face, and the first face and the second face both are planes parallel to each other.

In one example mode, a shape of a top edge of the concave reflecting face is round, oval, triangular, rectangular, pentagonal, hexagonal, or octagonal; and a shape of an intersecting line of the incident face and the first face is round, oval, triangular, rectangular, pentagonal, hexagonal, or octagonal.

In one example mode, both the light source cavities and the concave reflecting faces are arranged in plural, and the light source cavities are arranged opposite to the concave reflecting faces one by one.

In one example mode, the light source cavities are arranged at intervals, and adjacent ones of the concave reflecting faces are connected to each other.

In one example mode, the light source cavities are arranged in a line and row manner, and the light source cavities in different lines are arranged in an aligned manner or staggered manner in a row direction, and the concave reflecting faces are arranged in a line and row manner, and the concave reflecting faces in different lines are arranged in an aligned manner or staggered manner in the row direction.

In one example mode, the incident face further includes a columnar face, the Fresnel surface is connected to the first face through the columnar face, and an extension direction of the columnar face is parallel to an optical axis of a light emitting unit.

In one example mode, a distance between a lowest point of the concave reflecting face and a top edge of the concave reflecting face in a direction of an optical axis of a light emitting unit is a first depth, the lowest point is the point on the concave reflecting face which is closest to the first face, and a ratio between the first depth and a thickness of the light distribution element is in a range from $1/3$ to $2/3$; and a distance between a highest point of the incident face and a bottom edge of the incident face in the direction of the optical axis is a second depth, the highest point is the point on the incident face which is farthest to the first face, and a ratio between the second depth and the thickness of the light distribution element is in a range from $1/5$ to $1/2$. A direction of the thickness is parallel to the optical axis.

In one example mode, the light distribution element further includes a concave light homogenizing face, and the concave light homogenizing face is formed in a manner that the first face is concaved towards a side where the concave reflecting face is located.

In one example mode, the concave light homogenizing faces are arranged in plural and are arranged in a line and row manner or in a circular radiation manner.

In one example mode, an intersecting line of the concave light homogenizing face and the first face is a circular intersecting line, and a diameter of the circular intersecting line is in a range from 0.8 to 1 mm.

In one example mode, the light distribution element is a light guiding cover.

At a second aspect, an example of the present disclosure provides a light source assembly including a light source plate, a light emitting unit arranged on the light source plate and a light distribution element arranged on the light source plate.

The light distribution element includes: a light source cavity, a first face, an incident face and an emitting face. The first face and the emitting face are arranged opposite to each other. The light source cavity is formed in a manner that the first face is concaved towards a side where the emitting face is located. The incident face is an inner surface of the light source cavity, and the incident face includes a Fresnel surface. The emitting face includes a concave reflecting face, and the concave reflecting face is concaved towards a side where the incident face is located. The light distribution element covers the light emitting unit, and the first face is attached to the light source plate.

At a third aspect, an example of the present disclosure provides a lighting lamp including a driver and a light source assembly, and the driver is electrically connected to the light source assembly.

The light source assembly includes a light source plate, a light emitting unit arranged on the light source plate, and a light distribution element arranged on the light source plate. The light distribution element includes a light source cavity, a first face, an incident face and an emitting face. The first face and the emitting face are arranged opposite to each other and the light source cavity is formed in a manner that the first face is concaved towards a side where the emitting face is located. The incident face is an inner surface of the light source cavity, and the incident face includes a Fresnel surface. The emitting face includes a concave reflecting face, and the concave reflecting face is concaved towards a side where the incident face is located. The light distribution element covers the light emitting unit, and the first face is attached to the light source plate.

The technical scheme adopted in the present disclosure may achieve the following beneficial effects: the light distribution element disclosed in the present disclosure is provided with a light source cavity opposite to an emitting face, thus, light emitting units may be arranged below the light distribution element, the requirement for light emitting uniformity may be met by matching fewer light emitting units to the light distribution element, and therefore a lighting lamp adopting the light distribution element is lower in cost. Meanwhile, the light source cavity may accommodate the light emitting unit, so that the space integrally occupied by the entirety of the light distribution element and the light emitting unit is reduced, and accordingly the space utilization rate of the lighting lamp is increased.

The present disclosure may include dedicated hardware implementations such as application specific integrated circuits, programmable logic arrays and other hardware devices. The hardware implementations can be constructed to implement one or more of the methods described herein. Examples that may include the apparatus and systems of various implementations can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors. The module refers herein may include one or more circuit with or without stored code or instructions. The module or circuit may include one or more components that are connected.

The above examples of the application focus on the differences between the examples. The different optimization features between the examples can be combined to form a better example as long as the different optimization features between the examples are not contradictory, which will not be repeated here for conciseness.

What are described above is related to the examples of the present disclosure only and not limitative to the present disclosure. Various modification and change may be made by those skilled in the art. Any modification, equivalent replacement and modification made within the spirit and principle of the present disclosure are regarded as falling within the scope of the present disclosure.

The invention claimed is:

1. A light distribution element, comprising:
a light source cavity, a concave light homogenizing face, a first face, an incident face and an emitting face,
wherein the first face and the emitting face are arranged opposite directly to each other;
the light source cavity is formed in a manner that the first face is concaved towards a side where the emitting face is located;
the incident face is an inner surface of the light source cavity, and the incident face comprises a Fresnel surface;
the emitting face comprises a concave reflecting face, and the concave reflecting face is concaved towards a side where the incident face is located;
the first face is concaved towards a side where the concave reflecting face is located, and the concave light homogenizing face and the incident face are the same in a concave direction, and the concave light homogenizing face is arranged to provide a light homogenizing effect; and
the incident face further comprises a columnar face, the Fresnel surface is connected to the first face through the columnar face, and an extension direction of the columnar face is parallel to an optical axis of a light emitting unit such that the columnar face adjusts a spreading direction of light rays emitted by the light emitting unit.

2. The light distribution element according to claim 1, wherein in a direction parallel to an optical axis of the light emitting unit, a section of the concave reflecting face is in a V shape.

3. The light distribution element according to claim 2, wherein the concave reflecting face is a revolution surface, and a revolution axis of the concave reflecting face is parallel to the optical axis; and
the Fresnel surface is a revolution surface, a revolution axis of the Fresnel surface is parallel to the optical axis, and a circle center of the Fresnel surface is on the optical axis.

4. The light distribution element according to claim 3, wherein a point on the concave reflecting face which is closest to the circle center is a lowest point of the concave reflecting face, and the lowest point is on the optical axis and the revolution axis of the Fresnel surface at the same time.

5. The light distribution element according to claim 3, wherein a revolution generatrix of the concave reflecting face is an arc curve, and in a direction close to the incident face, a curvature of at least a part of the arc curve is gradually increased firstly and then gradually reduced.

6. The light distribution element according to claim 1, wherein in a direction parallel to an optical axis of the light emitting unit, a projection face of the concave reflecting face covers a projection face of the incident face.

7. The light distribution element according to claim 1, wherein the emitting face further comprises a second face connected to the concave reflecting face, and the first face and the second face both are planes parallel to each other.

8. The light distribution element according to claim 1, wherein:
a shape of a top edge of the concave reflecting face is round, oval, triangular, rectangular, pentagonal, hexagonal, or octagonal; and
a shape of an intersecting line of the incident face and the first face is round, oval, triangular, rectangular, pentagonal, hexagonal, or octagonal.

9. The light distribution element according to claim 1, wherein both the light source cavities and the concave reflecting faces are arranged in plural, and the light source cavities are arranged opposite to the concave reflecting faces one by one.

10. The light distribution element according to claim 9, wherein the light source cavities are arranged at intervals, and adjacent ones of the concave reflecting faces are connected to each other.

11. The light distribution element according to claim 10, wherein:
the light source cavities are arranged in a line and row manner, and the light source cavities in different lines are arranged in an aligned manner or staggered manner in a row direction, and
the concave reflecting faces are arranged in a line and row manner, and the concave reflecting faces in different lines are arranged in an aligned manner or staggered manner in the row direction.

12. The light distribution element according to claim 1, wherein:
a distance between a lowest point of the concave reflecting face and a top edge of the concave reflecting face in a direction of an optical axis of the light emitting unit is a first depth, the lowest point is the point on the concave reflecting face which is closest to the first face, and a ratio between the first depth and a thickness of the light distribution element is in a range from $1/3$ to $2/3$; and
a distance between a highest point of the incident face and a bottom edge of the incident face in the direction of the optical axis is a second depth, the highest point is the point on the incident face which is farthest to the first face, and a ratio between the second depth and the thickness of the light distribution element is in a range from $1/5$ to $1/2$;
wherein a direction of the thickness is parallel to the optical axis.

13. The light distribution element according to claim 1, wherein the concave light homogenizing faces are arranged in plural and are arranged in a line and row manner or in a circular radiation manner.

14. The light distribution element according to claim 13, wherein an intersecting line of the concave light homogenizing face and the first face is a circular intersecting line, and a diameter of the circular intersecting line is in a range from 0.8 to 1 mm.

15. The light distribution element according to claim 1, wherein the light distribution element is a light guiding cover.

16. A light source assembly, comprising:
a light source plate;
a light emitting unit arranged on the light source plate; and
a light distribution element arranged on the light source plate;
wherein the light distribution element comprises: a light source cavity, a concave light homogenizing face, a first face, an incident face and an emitting face,
wherein the first face and the emitting face are arranged opposite directly to each other;
the light source cavity is formed in a manner that the first face is concaved towards a side where the emitting face is located;
the incident face is an inner surface of the light source cavity, and the incident face comprises a Fresnel surface;
the emitting face comprises a concave reflecting face, and the concave reflecting face is concaved towards a side where the incident face is located;
the first face is concaved towards a side where the concave reflecting face is located, and the concave light homogenizing face and the incident face are the same in a concave direction, and the concave light homogenizing face is arranged to provide a light homogenizing effect; and
the incident face further comprises a columnar face, the Fresnel surface is connected to the first face through the columnar face, and an extension direction of the columnar face is parallel to an optical axis of a light emitting unit such that the columnar face adjusts a spreading direction of light rays emitted by the light emitting unit; and
the light distribution element covers the light emitting unit, and the first face is attached to the light source plate.

17. A lighting lamp, comprising:
a driver; and
a light source assembly, wherein the driver is electrically connected to the light source assembly;
wherein the light source assembly comprises a light source plate, a light emitting unit arranged on the light source plate, and a light distribution element arranged on the light source plate;
wherein the light distribution element comprises: a light source cavity, a concave light homogenizing face, a first face, an incident face and an emitting face,
wherein the first face and the emitting face are arranged opposite directly to each other;
the light source cavity is formed in a manner that the first face is concaved towards a side where the emitting face is located;
the incident face is an inner surface of the light source cavity, and the incident face comprises a Fresnel surface;
the emitting face comprises a concave reflecting face, and the concave reflecting face is concaved towards a side where the incident face is located;
the first face is concaved towards a side where the concave reflecting face is located, and the concave light homogenizing face and the incident face are the same in a concave direction, and the concave light homogenizing face is arranged to provide a light homogenizing effect; and
the incident face further comprises a columnar face, the Fresnel surface is connected to the first face through the columnar face, and an extension direction of the columnar face is parallel to an optical axis of a light emitting unit such that the columnar face adjusts a spreading direction of light rays emitted by the light emitting unit; and
the light distribution element covers the light emitting unit, and the first face is attached to the light source plate.

* * * * *